US012008552B1

(12) United States Patent
Shetti et al.

(10) Patent No.: US 12,008,552 B1
(45) Date of Patent: *Jun. 11, 2024

(54) BANK-DRIVEN MODEL FOR PREVENTING DOUBLE SPENDING OF DIGITAL CURRENCY COEXISTING ON MULTIPLE DLT NETWORKS

(71) Applicant: Wells Fargo Bank N.A., San Francisco, CA (US)

(72) Inventors: Abhijit Shetti, Pleasanton, CA (US); Laura Marie Fontana, San Francisco, CA (US); Rameshchandra B. Ketharaju, Hyderabad (IN); Andrew J. Garner, IV, State Road, NC (US); Nikolai Stroke, Gilbert, AZ (US); Duc Trinh, Golden Valley, MN (US); Mabel Oza, San Francisco, CA (US); Todd Biggs, San Francisco, CA (US)

(73) Assignee: Wells Fargo Bank N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/079,674

(22) Filed: Dec. 12, 2022

Related U.S. Application Data (63) Continuation of application No. 16/795,282, filed on Feb. 19, 2020, now Pat. No. 11,526,875.

(51) Int. Cl.
*G06F 21/10* (2013.01)
*G06F 16/28* (2019.01)
(Continued)

(52) U.S. Cl.
CPC ......... *G06Q 20/3678* (2013.01); *G06F 16/28* (2019.01); *G06Q 20/0655* (2013.01);
(Continued)

(58) Field of Classification Search
CPC ...... G06F 21/105; G06F 21/125; G06F 21/16; G06F 21/64; H04L 9/3236; H04L 9/3247; H04L 9/3239; H04L 9/50
(Continued)

(56) References Cited

U.S. PATENT DOCUMENTS 9,720,925 B1 * 8/2017 Lawson ................ G06F 40/194
10,339,299 B1 * 7/2019 Magnuson .............. G06F 21/52
(Continued)

OTHER PUBLICATIONS

Luo et al. ("Ariadne: An Eclipse-based system for tracking the originality of source code", IBM Systems Journal, vol. 46, No. 2, 2007) (Year: 2007).*
(Continued)

*Primary Examiner* — James D Nigh
(74) *Attorney, Agent, or Firm* — Foley & Lardner LLP (57) ABSTRACT

A system and method for preventing the double-spending of digital currency that transfers between multiple DLT networks. The system and method includes creating a first digital currency of a first type on the first DLT network stored in a digital wallet, the first digital currency associated with a second digital currency of a second type on a second DLT network, configuring a monitoring agent on the node, the monitoring agent configured to intercept at least one of a function call, a message, or an event on the digital wallet, and locking, responsive to intercepting the at least one of the function call, the message, or the event, the first digital currency onto the first DLT network to prevent a transfer of the first digital currency from the digital wallet on the first DLT network to another DLT network responsive to a subsequent transaction request.

20 Claims, 4 Drawing Sheets

(51) Int. Cl.
  *G06F 21/12*  (2013.01)
  *G06Q 20/06*  (2012.01)
  *G06Q 20/36*  (2012.01)
  *G06Q 40/04*  (2012.01)
  *H04L 9/32*  (2006.01)
  *H04L 9/40*  (2022.01)
  *G06F 21/16*  (2013.01)
  *G06F 21/64*  (2013.01)
  *H04L 9/00*  (2022.01)

(52) U.S. Cl.
  CPC ......... *G06Q 20/3672* (2013.01); *G06Q 40/04* (2013.01); *H04L 63/08* (2013.01); *G06Q 2220/00* (2013.01)

(58) Field of Classification Search
  USPC .......................................................... 705/59
  See application file for complete search history.

(56) References Cited

U.S. PATENT DOCUMENTS

| | | | |
|---|---|---|---|
| 10,339,523 B2 | 7/2019 | Mcdonough et al. | |
| 10,373,158 B1 | 8/2019 | James et al. | |
| 10,387,881 B2 | 8/2019 | Studnitzer | |
| 2006/0116966 A1* | 6/2006 | Pedersen | G06F 21/10 705/59 |
| 2016/0012424 A1 | 1/2016 | Simon et al. | |
| 2016/0162897 A1 | 6/2016 | Feeney | |
| 2016/0202972 A1* | 7/2016 | Sass | G06F 8/75 717/121 |
| 2018/0075421 A1 | 3/2018 | Serrano et al. | |
| 2018/0089759 A1 | 3/2018 | Stradling et al. | |
| 2018/0091316 A1 | 3/2018 | Stradling et al. | |
| 2018/0189781 A1 | 7/2018 | Mccann et al. | |
| 2018/0204192 A1 | 7/2018 | Whaley et al. | |
| 2018/0211318 A1 | 7/2018 | Parikh et al. | |
| 2018/0253702 A1 | 9/2018 | Dowding | |
| 2018/0329693 A1* | 11/2018 | Eksten | G06F 8/65 |
| 2018/0365764 A1 | 12/2018 | Nelson | |
| 2019/0043043 A1 | 2/2019 | Saraniecki et al. | |
| 2019/0058581 A1 | 2/2019 | Wood et al. | |
| 2019/0065709 A1* | 2/2019 | Salomon | H04L 9/0643 |
| 2019/0095879 A1 | 3/2019 | Eyal et al. | |
| 2019/0139037 A1 | 5/2019 | Khalil et al. | |
| 2019/0156301 A1 | 5/2019 | Bentov et al. | |
| 2019/0180371 A1 | 6/2019 | Benkert et al. | |
| 2019/0236594 A1 | 8/2019 | Ehrlich-Quinn | |
| 2019/0311337 A1 | 10/2019 | Madisetti et al. | |
| 2020/0151817 A1 | 5/2020 | Mahfouz | |
| 2020/0287874 A1* | 9/2020 | Bertram | G06Q 30/018 |
| 2020/0327498 A1 | 10/2020 | Weber et al. | |
| 2020/0394651 A1 | 12/2020 | Kreder et al. | |
| 2021/0019737 A1 | 1/2021 | Vladi | |
| 2021/0097528 A1 | 4/2021 | Wang | |
| 2021/0158443 A1 | 5/2021 | Kilgore et al. | |
| 2021/0182848 A1 | 6/2021 | Benko | |

OTHER PUBLICATIONS

Dewey ("Blockchain & Cryptocurrency Regulation, 2019, First Edition", Global Legal Group Ltd., Sep. 4, 2018, 505 pages) (Year: 2018).*
AMP Whitepaper ("Amp: A digital collateral token to enable immediate settlement of payment transactions", Nov. 24, 2020, amptoken.org, 35 pages) (Year: 2020).*
Applicature, "How to Avoid Double-Spending Attacks in Hybrid Blockchain," https://medium.com/applicature/how-to-avoid-double-spending-attacks-in-hybrid-blockchain-280f311e574f (Oct. 9, 2018). (Year: 2018).
Mihail S. "Capturing Suspicious Transactions on the Ethereum Blockchain," Dev Blog, https://www.apriorit.com/dev-blog/562-suspicious-ethereum-transactions (Sep. 6, 2018). (Year: 2018).

* cited by examiner

Creating, by one or more processors and based on a unit of fiat currency, a first digital currency of a first type on a first distributed ledger technology (DLT) network and a second digital currency of a second type on a second DLT network. In some arrangements, each of the first digital currency and the second digital currency equally representing a value associated with the unit of fiat currency
302

Detecting, by the one or more processors, a transaction request to transfer the first digital currency from the first DLT network to the second DLT network
304

Locking, by the one or more processors responsive to detecting the transaction request, the first digital currency onto the first DLT network to prevent a transfer of the first digital currency from the first DLT network to another DLT network responsive to a subsequent transaction request.
306

Creating, by a node of a first distributed ledger technology (DLT) network, a first digital currency of a first type on the first DLT network, the first digital currency associated with a second digital currency of a second type on a second DLT network
402

Intercepting, by the node of the first DLT network, a transaction request to transfer the first digital currency from the first DLT network to the second DLT network
404

Locking, by the node of the first DLT network responsive to intercepting the transaction request, the first digital currency onto the first DLT network to prevent a transfer of the first digital currency from the first DLT network to another DLT network responsive to a second transaction request
406 determining, by the node of the first DLT network, a presence or an absence of the second digital currency on the second DLT network
408

FIG. 4

BANK-DRIVEN MODEL FOR PREVENTING DOUBLE SPENDING OF DIGITAL CURRENCY COEXISTING ON MULTIPLE DLT NETWORKS

CROSS-REFERENCE TO RELATED APPLICATIONS

This application is a continuation of U.S. patent application Ser. No. 16/795,282, titled "Bank-Driven Model For Preventing Double Spending Of Digital Currency Coexisting On Multiple DLT Networks," filed on Feb. 19, 2022, which is incorporated herein by reference in its entirety and for any and all purposes.

BACKGROUND

Digital currency (also referred to as, "digital money", "electronic money", or "electronic currency") is a type of currency available in digital form, as opposed to physical currency, such as banknotes and physical coins. It exhibits properties similar to physical currencies, but can allow for instantaneous transactions and borderless transfer-of-ownership. Examples of digital currency include virtual currencies, cryptocurrencies, and central bank digital currency. These currencies may be used to buy physical goods and services, but may also be restricted to certain communities such as for use inside an online game and/or software application.

SUMMARY

Aspects of the present disclosure relate generally to distributed ledger technology in the field of cryptocurrency, and more particularly to systems and methods for preventing the double-spending of digital currency that transfers between multiple distributed ledger technology (DLT) networks.

One aspect disclosed herein is directed to a method for preventing the double-spending of digital currency that transfers between multiple DLT networks. In some arrangements, the method includes creating, based on a unit of fiat currency, a first digital currency of a first type on a first DLT network and a second digital currency of a second type on a second DLT network. In some arrangements, each of the first digital currency and the second digital currency simultaneously represent a value associated with the unit of fiat currency for at least a period of time. In some arrangements, the method includes detecting a transaction request to transfer the first digital currency from the first DLT network to the second DLT network. In some arrangements, the method includes locking, responsive to detecting the transaction request, the first digital currency onto the first DLT network to prevent a transfer of the first digital currency from the first DLT network to another DLT network responsive to a subsequent transaction request.

In another aspect, the present disclosure is directed to a system for preventing the double-spending of digital currency that transfers between multiple DLT networks. In some arrangements, the system includes one or more processors; and one or more computer-readable storage mediums storing instructions which, when executed by the one or more processors, cause the one or more processors to create, based on a unit of fiat currency, a first digital currency of a first type on a first DLT network and a second digital currency of a second type on a second DLT network. In some arrangements, each of the first digital currency and the second digital currency simultaneously represent a value associated with the unit of fiat currency for at least a period of time. In some arrangements, the system includes one or more processors and one or more computer-readable storage mediums storing instructions which, when executed by the one or more processors, cause the one or more processors to detect a transaction request to transfer the first digital currency from the first DLT network to the second DLT network. In some arrangements, the system includes one or more processors and one or more computer-readable storage mediums storing instructions which, when executed by the one or more processors, cause the one or more processors to lock, responsive to detecting the transaction request, the first digital currency onto the first DLT network to prevent a transfer of the first digital currency from the first DLT network to another DLT network responsive to a subsequent transaction request.

One aspect disclosed herein is directed to a method for preventing the double-spending of digital currency that transfers between multiple DLT networks. In some arrangements, the method includes creating, by a node of a first DLT network, a first digital currency of a first type on the first DLT network, the first digital currency associated with a second digital currency of a second type on a second DLT network. In some arrangements, the method includes intercepting, by the node of the first DLT network, a transaction request to transfer the first digital currency from the first DLT network to the second DLT network. In some arrangements, the method includes locking, by the node of the first DLT network responsive to intercepting the transaction request, the first digital currency onto the first DLT network to prevent a transfer of the first digital currency from the first DLT network to another DLT network responsive to a second transaction request. In some arrangements, the method includes determining, by the node of the first DLT network, a presence or an absence of the second digital currency on the second DLT network.

In another aspect, the present disclosure is directed to a non-transitory computer-readable storage medium storing instructions which, when executed by one or more processors, cause the one or more processors to perform operations including creating, based on a unit of fiat currency, a first digital currency of a first type on a first DLT network and a second digital currency of a second type on a second DLT network. In some arrangements, each of the first digital currency and the second digital currency simultaneously represent a value associated with the unit of fiat currency for at least a period of time. In some arrangements, the non-transitory computer-readable storage medium storing instructions which, when executed by one or more processors, cause the one or more processors to perform operations including detecting a transaction request to transfer the first digital currency from the first DLT network to the second DLT network. In some arrangements, the non-transitory computer-readable storage medium storing instructions which, when executed by one or more processors, cause the one or more processors to perform operations including locking, by the one or more processors responsive to detecting the transaction request, the first digital currency onto the first DLT network to prevent a transfer of the first digital currency from the first DLT network to another DLT network responsive to a subsequent transaction request.

These and other features, together with the organization and manner of operation thereof, will become apparent from

BRIEF DESCRIPTION OF THE FIGURES

Like reference numbers and designations in the various drawings indicate like elements.

DETAILED DESCRIPTION

A cryptocurrency (or crypto currency) is a digital currency designed to work as a medium of exchange that uses strong cryptography to secure financial transactions, control the creation of additional units, and verify the transfer of assets. Cryptocurrencies use decentralized control as opposed to centralized digital currency and central banking systems. The decentralized control of each cryptocurrency works through distributed ledger technology (DLT), such as a blockchain, that serves as an electronic public financial transaction database Cryptocurrency users store their cryptocurrency in digital wallets, where the purchase, sale, and exchange transactions occur in blocks. Each block connects to the previous block by means of a code, based on Blockchain technology. A cryptocurrency runs on a blockchain, which is a shared ledger or document duplicated several times across a network of computers ("nodes"). The updated document is distributed and made available to all nodes on the blockchain. Every single transaction made, and the ownership of every single cryptocurrency in circulation, is recorded in the blockchain. As such, the nodes of the blockchain or DLT network can prevent invalid transactions from taking place.

However, transferring digital currency such as a cryptocurrency between multiple DLT networks creates problems that the digital currency (or cryptocurrency) industry has yet to solve. Firstly, a DLT network operating a first type of cryptocurrency (e.g., Bitcoin) cannot communicate with a DLT network operating a second type of digital currency (e.g., Ethereum) due to at least their incompatible communication protocols. Furthermore, even if the DLT networks could communicate with one another, there is no mechanism for preventing the double-spending of the digital currency as it traverses across the networks because each network (and its respective nodes) manages an entirely different electronic ledger. As such, the nodes of one DLT network would be unable to verify and concretize the transactions of cryptocurrencies involving another DLT network.

Accordingly, the present disclosure is directed to systems and methods for preventing the double-spending of digital currency that transfers between multiple DLT networks. The multiple types of digital currency are created and mirrored based on the same collateral (also referred to herein as, "single-collateral"), such that they coexist on multiple DLT networks. An exchange node converts and/or exchanges a digital currency of a first type on a first DLT network to a digital currency of a second type on a second DLT network. The exchange node can then delete/destroy the digital currency of the first type on the first DLT network, or the DLT networks can directly communicate with one another via a single protocol to agree upon the destruction of mirrored/duplicative digital currency.

In general, as described in the below passages and specifically in the description of FIG. 1, an issuer (e.g., issuer 140 in FIG. 1) may operate an exchange node (e.g., exchange node 130 in FIG. 1) that hosts an exchange network for participating in transactions occurring between a plurality of Distributed Ledger Technology (DLT) networks (e.g., DLT networks 102, 104, 106 in FIG. 1) or blockchain networks. Each DLT network is associated with a digital currency or cryptocurrency of a particular type (e.g., Bitcoin, Ether, XRP, etc.) and includes a plurality of DLT nodes (also referred to herein as, "nodes") that are interconnected with one another to form a peer-to-peer network. The exchange network and the plurality of DLT networks are interconnected with one another via a communication network (e.g., communication network 120 in FIG. 1).

To begin, the exchange node adds any number of DLT networks (e.g., the Bitcoin network, the Ethereum network, the Ripple network, etc.) that are each associated with a particular type of digital currency (e.g., a Bitcoin for the Bitcoin network, an Ether for the Ethereum network, an XRP for the Ripple network, etc.) to the exchange network in response to receiving a request from any of the DLT networks. For example, a node (e.g., any one of nodes 103a-103d in FIG. 1) of a "first" DLT network (e.g., DLT network 102 in FIG. 1) associated with a "first" type of digital currency (e.g., a Bitcoin) may send a request to the exchange node to join the exchange network. In response to receiving the request, the exchange node adds the first DLT network to the exchange network by generating and sending a message to a node (e.g., the requesting node, a normal node, a master node) of the first DLT network to cause the node to grant permission for the exchange node to detect (e.g., monitor) the transaction requests that are sent by and/or received by a node of the first DLT network. The message also includes program code (e.g., a script, an executable) that, when executed by the node of the first DLT network, causes the node to install one or more monitoring agents (e.g., monitoring agent 150 in FIG. 1) on any or all of the nodes included in the first DLT network to allow the exchange node to detect an occurrence of such transaction requests. In some arrangements, a monitoring agent that is installed on a node may be configured to intercept the transaction requests that are sent by and/or received by the node, and redirect the transaction request (or a copy of the transaction request) to the exchange node. In some instances, the message may include a smart contract, that when executed by the node, causes the node to monitor/detect (or allow the exchange node to monitor/detect) the transactions that are made by the node. In some arrangements, the message may include program code that, when executed by the node of the first DLT network, causes the node to install one or more "hooks" that augment the behavior of an operating system and/or application (e.g., a digital wallet, a transaction ledger, etc.) executing on the node by intercepting function calls, messages, and/or events passed between the operating system and/or application, and redirecting the intercepted function calls, messages, and/or events to the exchange node.

Continuing with the example, a node (e.g., any one of nodes 105a-105d in FIG. 1) of a "second" DLT network (e.g., DLT network 104 in FIG. 1) associated with a "second" type of digital currency (e.g., an Ether) may also send a request to the exchange node to join the exchange network. In response to receiving the request from the second DLT network, the exchange node repeats the same process as discussed above with respect to the first DLT network, but with respect to the second DLT network. That is, the exchange node adds the second DLT network to the exchange network by generating and sending a message to a node (e.g., the requesting node, a normal node, a master node) of the second DLT network to cause the node to grant permission for the exchange node to detect (e.g., monitor) the transaction requests that are sent by and/or received by the second DLT network. The message also includes program code (e.g., a script, an executable) to cause the node to install one or more monitoring agents (e.g., monitoring agent 152 in FIG. 1) on any or all of the nodes included in the second DLT network to allow the exchange node to detect an occurrence of such transaction requests.

The exchange node then creates (e.g., mirrors, copies, etc.) multiple types of digital currency based on the same collateral for each of the DLT networks that were added to the exchange network. For example, the exchange node creates a digital currency of the first type (e.g., Bitcoin) on the first DLT network (e.g., a Bitcoin network) based on a unit of fiat currency (e.g., fiat currency 142 in FIG. 1) held by the issuer, and a digital currency of the second type (e.g., an Ether) on the second DLT network (e.g., an Ethereum network) based on the same unit of fiat currency. As such, the first currency created on the first DLT network and the second currency created on the second DLT network will simultaneously represent (e.g., on each of their respective DLT networks) the same unit of fiat currency that is held by the issuer for at least a period of time (e.g., milliseconds, seconds, minutes, hours, days, months, etc.). As a result, the digital currencies are considered "mirrored" and coexisting on the DLT networks, such that they are each available to be involved in a transaction. The exchange node also assigns and/or attaches a common serial number to each of the digital currency to indicate that the digital currency, despite existing on multiple DLT networks, were created from the same collateral.

The exchange node then monitors the communication to and/or from any of the DLT networks that have been added to the exchange network for requests (also referred to herein as, "a transaction request") to transfer a digital currency between nodes of the same DLT networks, as well as between nodes of different DLT networks. For example, the first DLT network may send a request (e.g., transaction request in FIG. 1) to transfer the first digital currency (e.g., a Bitcoin) from the first DLT network to the second DLT network. The exchange node detects the transaction request via the one or more monitoring agents that were previously installed on the first DLT network (e.g., installed on one or more nodes of the first DLT network) on behalf of the exchange node, or by receiving a copy of the transaction request that was redirected by the one or more "hooks" that were previously installed on the first DLT network on behalf of the exchange node. In response to detecting the transaction request, the exchange node locks (e.g., secures, freezes, suspends, etc.) the first digital currency onto the first DLT network to prevent a transfer of the first digital currency from the first DLT network to the second DLT network or any another DLT network (e.g., DLT network 106 in FIG. 1) responsive to a subsequent transaction request involving the first digital currency.

As discussed above, in some instances (not all), DLT networks that are associated with different types of digital currency may be unable to directly communicate with one another due to incompatible communication protocols. The exchange node, however, may bridge the communication between the DLT networks by translating their messages from one communication protocol to another communication protocol. Thus, by functioning as a "trusted intermediary", the exchange node may be able to detect when a DLT network makes a transaction request to another DLT network by monitoring the exact communication it has already been assigned to translate.

After locking the digital currency, the exchange node sends a confirmation request to the second DLT network to cause the second DLT network to confirm whether the transaction has completed. For example, a node of the second DLT network may search the second DLT network for the second digital currency that is associated with the first digital currency based on matching the serial number that is common to each digital currency. If the second digital currency does not exist on the second DLT network, then the second DLT sends a confirmation to the exchange node to indicate that the transaction has not been completed because the second digital currency was not found, which in turn, causes the exchange node to unlock the first digital currency from the first DLT network and send a message to the first DLT network to indicate that the transaction was denied by the second DLT network. However, if the second digital currency does exist on the second DLT network, then the second DLT sends a confirmation back to the first DLT network to indicate that the transaction had been completed because the second digital currency was found, which in turn, causes the exchange node to destroy the first digital currency on the first DLT network. In some arrangements, instead of relying on communication from the second DLT network, the exchange node may search the second DTL network for the second digital currency. In some arrangements, the exchange node may keep (maintain, preserve, etc.) the first digital currency locked to the first DLT network instead of destroying the first digital currency, thereby allowing the second DLT network to transfer the second digital currency back to the first DLT network if requested via a second transaction request.

Thus, the exchange node is able to prevent the double spending of the first digital currency as a result of a subsequent transaction by locking the first digital currency onto the first DLT network until the first transaction is either approved/completed or denied/canceled.

Figure 1:
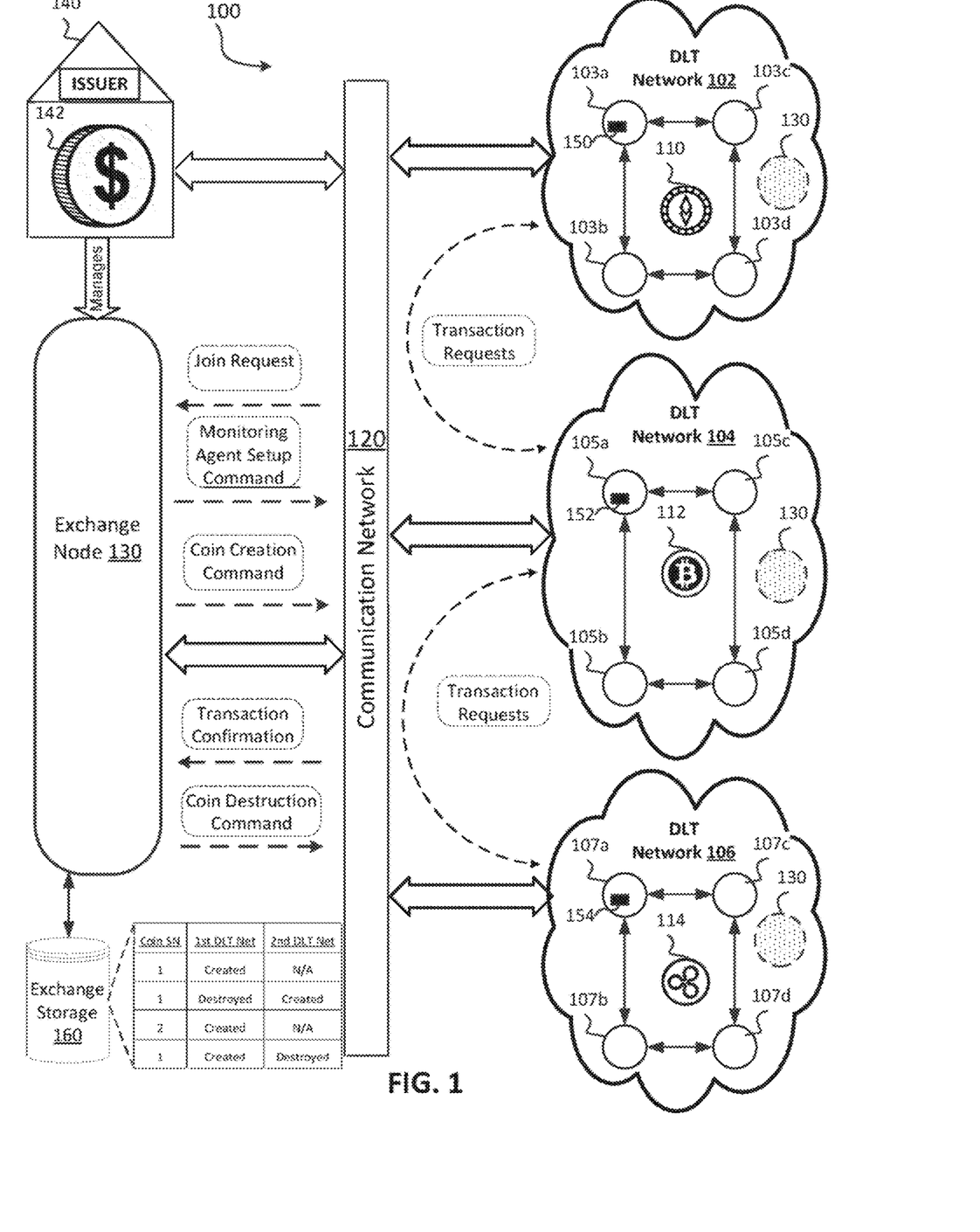
FIG. 1 is a block diagram depicting an example environment systems and methods for preventing the double-spending of digital currency that transfers between multiple DLT networks, according to some arrangements.

FIG. 1 is a block diagram depicting an example environment for preventing the double-spending of digital currency that transfers between multiple DLT networks, according to some arrangements. The environment 100 includes DLT networks 102, 104, 106 that are each associated with a digital currency or cryptocurrency of a particular type in that each DLT network 102, 104, 106 hosts a public ledger that is governed by source code consisting of cryptologic and/or algorithmic protocols. DLT network 102 is associated with digital currency 110, DLT network 104 is associated with digital currency 112, and DLT network 106 is associated with digital currency 114. Each digital currency may maintain a locked or unlocked state. For example, as shown in FIG. 1, digital currency 110 is in an unlocked state, digital currency 112 is in a locked state (shown as locked digital currency 116), and digital currency 114 is in an unlocked state. Although FIG. 1 shows digital currency 110 as an Ether for an Ethereum network, digital currency 112 as a Bitcoin for a Bitcoin network, and digital currency 114 as an XRP for the Ripple network, it will be appreciated by those skilled in the art that DLT networks 102, 104, 106 may be any type of DLT network. As such, digital currencies 110, 112, 114 may be any type of digital currency that is supported by the corresponding DLT network.

Each DLT network 102, 104, 106 includes a plurality of nodes that are interconnected with one another to form a peer-to-peer network. As shown in FIG. 1, the DLT network 102 includes nodes 103a, 103b, 103c, 103d (collectively referred to herein as, "nodes 103") that are interconnected with one another to form a "first" peer-to-peer network; the DLT network 104 includes nodes 105a, 105b, 105c, 105d (collectively referred to herein as, "nodes 105") that are interconnected with one another to form a "second" peer-to-peer network; and the DLT network 106 includes nodes 107a, 107b, 107c, 107d (collectively referred to herein as, "nodes 107") that are interconnected with one another to form a "third" peer-to-peer network. While in some examples the environment 100 is described as including the first, second, and third peer-to-peer networks, in various other examples, more or less than three networks may be included.

The environment 100 also includes an exchange node 130 that hosts an exchange network for participating in transactions occurring between any of the nodes of the DLT networks 102, 104, 106. The exchange network and the DLT networks 102, 104, 106, are interconnected with one another via a communication network (e.g., communication network 120 in FIG. 1). Each of the DLT networks 102, 104, 106; the nodes 103, 105, 107; and the exchange node 130 include hardware elements, such as one or more processors, logic devices, or circuits.

As shown in FIG. 1, the exchange node is a separate entity from each of DLT networks 102, 104, 106. That is, the exchange node resides and executes outside of DLT network 102, 104, 106. In some arrangements, the exchange node may optionally execute on or within at least one of DLT networks 102, 104, 106.

The DLT networks 102, 104, 106 may be associated with the same or different types of digital currency. For example, the DLT network 102 may be a Bitcoin network that host a public ledger associated with a Bitcoin, the DLT network 104 may be an Ethereum network that hosts a public ledger associated with an Ether, and the DLT network 106 may be a Ripple network that hosts a public ledger associated with an XRP. As another example, each DLT network 102 may be a Bitcoin network that hosts a public ledger associated with a Bitcoin.

A node (e.g., nodes 103a-d, nodes 105a-d, nodes 107a-d) is an electronic computing device that is capable of conducting digital currency transactions (e.g., shown in FIG. 1 as "transaction requests") with another node. The transactions that are performed by the nodes on a particular DLT network are recorded in an electronic transaction ledger (e.g., transaction ledger 218B in FIG. 2B). Each node may store and broadcast copies of the electronic transaction ledger to neighboring nodes to ensure that each node in the DLT network may be able to validate the transactions that occur on the DLT network via a set of consensus rules. Each node is also capable of sending a join request (shown in FIG. 1 as "join requests") to the exchange node 130 to join the exchange network. Each node is also capable of receiving a message (e.g., shown in FIG. 1 as, "monitoring agent setup command") to install a monitoring agent onto the node and/or the DLT network associated with the node to allow the exchange node to monitor/detect the transactions that are made by the node. For example, node 103a may install one or more monitoring agents 150 on any of the nodes (including itself) associated with DLT network 102; node 105a may install one or more monitoring agents 152 on any of the nodes (including itself) associated with DLT network 104; and node 107a may install one or more monitoring agents 154 on any of the nodes (including itself) associated with DLT network 106. Although FIG. 1 shows monitoring agent 150 executing on node 103a, a monitoring agent 150 may be installed on any other node (e.g., node 103b, node 103c, node 103d) associated with DLT network 102. Although FIG. 1 shows monitoring agent 152 executing on node 105a, a monitoring agent 152 may be installed on any other node (e.g., node 105b, node 105c, node 105d) associated with DLT network 104. Although FIG. 1 shows monitoring agent 154 executing on node 105a, a monitoring agent 154 may be installed on any other node (e.g., node 107b, node 107c, node 107d) associated with DLT network 106.

In some instances, the message (e.g., shown in FIG. 1 as, "monitoring agent setup command") may include a smart contract, that when executed by the node, causes the node to monitor/detect (or allow the exchange node to monitor/detect) the transactions that are made by the node. Each node is also capable of sending a transaction confirmation (e.g., shown in FIG. 1 as, "transaction confirmation") to the exchange node 130 indicating whether a transaction has completed. Each node is also capable of receiving a message (e.g., shown in FIG. 1 as, "lock/unlock command") from the exchange node 130 to lock or unlock a digital currency to/from the DLT network of the node. Each node is also capable of receiving a message (e.g., shown in FIG. 1 as, "coin creation command") to create/add a digital currency onto the DLT network of the node. For example, the message may add an entry to the electronic transaction ledger of the node. Each node is also capable of receiving a message (e.g., shown in FIG. 1 as, "coin destruction command") to destroy/remove a digital currency from the DLT network of the node. For example, the message may remove an entry from the electronic transaction ledger of the node. The other nodes in the DLT network become aware of the newly created digital currency or newly destroyed digital currency when the node, during the electronic ledger reconciliation process, broadcasts its electronic transaction ledger to its neighboring nodes.

A node may be any number of different types of electronic computing devices (also referred to herein as, "computing device" and "electronic device") adapted to communicate over a communication network 120, including without limitation, a digital wallet (also known as an "e-Wallet"), a personal computer, a laptop computer, a desktop computer, a mobile computer, a tablet computer, a smart phone, an application server, a catalog server, a communications server, a computing server, a database server, a file server, a game server, a mail server, a media server, a proxy server, a virtual server, a web server, or any other type and form of computing device or combinations of devices.

As used herein, a node may be a "normal" node" or as a "master node". While a normal node and a master node are both electronic computing devices, a master node (also known as a "super node") differs from a normal node in that a master node has more computing resources (e.g., computing power, memory resources, networking bandwidth, storage space, etc.) than a normal node. Next to validating, saving and broadcasting transactions (which are the same operations performed by a normal node), a master node may also facilitate other events on the DLT network, such as governing voting events, providing execution of protocol operations, and enforcing the laws of the corresponding DLT network. Unlike a normal node, a master node may also maintain a constant, active connection with one or more nodes of the DLT network. As such, a master node generally requires much more resources (e.g., electricity, up-time, maintenance, storage space, memory) than a normal node.

An exchange node 130 is an electronic computing device that monitors the transaction requests sent between nodes of the same DLT network and/or nodes of different DLT networks. The exchange node 130 is also capable of receiving a join request (shown in FIG. 1 as "join requests") from a node to join an exchange network (not shown in FIG. 1) that is managed (hosted) by the exchange node 130. The exchange node 130 is also capable of sending a message (e.g., shown in FIG. 1 as, "monitoring agent setup command") to install a monitoring agent onto a node and/or the DLT network associated with the node. The exchange node 130 is also capable of receiving a transaction confirmation (e.g., shown in FIG. 1 as, "transaction confirmation") from a node indicating whether a transaction between nodes has completed. The exchange node 130 is also capable of sending a message (e.g., shown in FIG. 1 as, "lock/unlock command") to a node to lock or unlock a digital currency to the DLT network of the node. The exchange node 130 is also capable of sending a message (e.g., shown in FIG. 1 as, "coin creation command") to a node to create/add a digital currency onto the DLT network of the node. For example, the message may create/add an entry to the electronic transaction ledger associated with the DLT network of the node. The exchange node 130 is also capable of sending a message (e.g., shown in FIG. 1 as, "coin destruction command") to a node to destroy/remove a digital currency from the DLT network of the node. For example, the message may destroy/remove an entry from the electronic transaction ledger associated with the DLT network of the node. As discussed above, the other nodes in the DLT network update their respective electronic transaction ledgers to show the newly added digital currency or newly destroyed digital currency when the node, during the electronic ledger reconciliation process, broadcasts its electronic transaction ledger to its neighboring nodes.

The environment 100 includes an issuer 140 that develops, registers, and sells securities for the purpose of financing its operations. The issuer 140 may be a corporation, a bank, an investment trust, or a domestic or foreign government. The issuer 140 may make available the following types of securities: common and preferred stocks, bonds, notes, debentures, bills and derivatives. The issuer 140 maintains (e.g., stores) fiat currency 142 on behalf of an account holder of the issuer 140. The issuer 140 includes any number of electronic computing devices (not shown in FIG. 1) for the purpose of operating/managing the exchange node 130, and for communicating with any other electronic computing device that is connected to the communication network 120.

Fiat currency 142 (also referred to herein as, "fiat money") money is the currency that a government has declared to be legal tender, but it is not backed by a physical commodity. The value of each country's fiat currency is determined by the supply of the currency and the demand for it to purchase goods and services. Fiat currencies 142 are backed by the credit of the economy and taxing authority of the government that issues it, as well as the faith of those who choose to use it.

The environment 100 includes a serial number storage 160 for storing serial numbers that are associated (e.g., assigned, attached, etc.) with the digital currency that exist on any of the DLT networks 102, 104, 106 in environment 100.

The communication network 120 is a local area network (LAN), a wide area network (WAN), a personal area network (PAN), or a combination of these or other networks, that interconnect the electronic computing devices (as discussed herein) and/or databases. The environment 100 may include many thousands of DLT networks 102, 104, 106; nodes 103, 105, 107; exchange nodes 130; and issuers 140 that are interconnected in any arrangement to facilitate the exchange of data between such electronic computing devices.

Figure 2A:
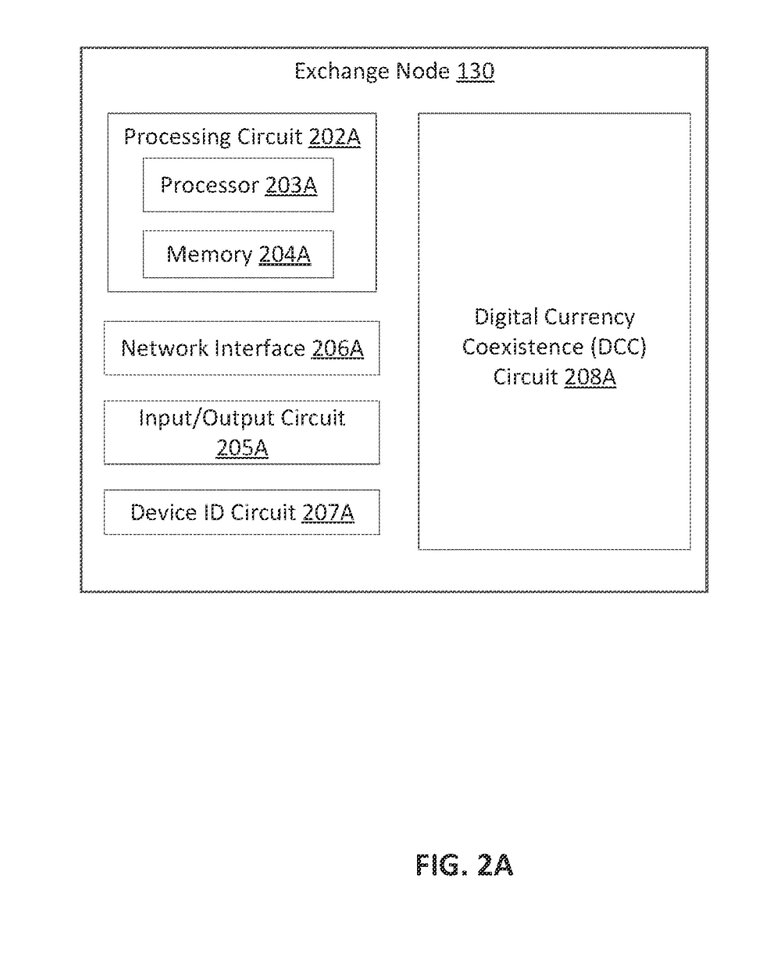
FIG. 2A is a block diagram depicting an example exchange node of the environment in FIG. 1, according to some arrangements.

FIG. 2A is a block diagram depicting an example exchange node of the environment in FIG. 1, according to some arrangements. While various circuits, interfaces, and logic with particular functionality are shown, it should be understood that the exchange node 130 includes any number of circuits, interfaces, and logic for facilitating the functions described herein. For example, the activities of multiple circuits may be combined as a single circuit and implemented on a single processing circuit (e.g., processing circuit 202A), as additional circuits with additional functionality are included.

The exchange node 130 includes a processing circuit 202A composed of one or more processors 203A and a memory 204A. A processor 203A may be implemented as a general-purpose processor, a microprocessor, an Application Specific Integrated Circuit (ASIC), one or more Field Programmable Gate Arrays (FPGAs), a Digital Signal Processor (DSP), a group of processing components, or other suitable electronic processing components. In many arrangements, processor 203A may be a multi-core processor or an array (e.g., one or more) of processors.

The memory 204A (e.g., Random Access Memory (RAM), Read-Only Memory (ROM), Non-volatile RAM (NVRAM), Flash Memory, hard disk storage, optical media, etc.) of processing circuit 202A stores data and/or computer instructions/code for facilitating at least some of the various processes described herein. The memory 204A includes tangible, non-transient volatile memory, or non-volatile memory. The memory 204A stores programming logic (e.g., instructions/code) that, when executed by the processor 203A, controls the operations of the exchange node 130. In some arrangements, the processor 203A and the memory 204A form various processing circuits described with respect to the exchange node 130. The instructions include code from any suitable computer programming language such as, but not limited to, C, C++, C #, Java, JavaScript, VBScript, Perl, HTML, XML, Python, TCL, and Basic. In some arrangements (referred to as "headless servers"), the exchange node 130 may omit the input/output circuit (e.g., input/output circuit 205A), but may communicate with an electronic computing device via a network interface (e.g., network interface 206A).

The exchange node 130 includes a network interface 206A configured to establish a communication session with a computing device for sending and receiving data over the communication network 120 to the computing device. Accordingly, the network interface 206A includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some arrangements, the exchange node 130 includes a plurality of network interfaces 206A of different types, allowing for connections to a variety of networks, such as local area networks or wide area networks including the Internet, via different sub-networks.

The exchange node 130 includes an input/output circuit 205A configured to receive user input from and provide information to a user of the exchange node 130. In this regard, the input/output circuit 205A is structured to exchange data, communications, instructions, etc. with an input/output component of the exchange node 130. Accordingly, input/output circuit 205A may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the exchange node 130, such as a built-in display, touch screen, microphone, etc., or external to the housing of the exchange node 130, such as a monitor connected to the exchange node 130, a speaker connected to the exchange node 130, etc., according to various arrangements. In some arrangements, the input/output circuit 205A includes communication circuitry for facilitating the exchange of data, values, messages, and the like between the input/output device and the components of the exchange node 130. In some arrangements, the input/output circuit 205A includes machine-readable media for facilitating the exchange of information between the input/output device and the components of the exchange node 130. In still another arrangement, the input/output circuit 205A includes any combination of hardware components (e.g., a touchscreen), communication circuitry, and machine-readable media.

The exchange node 130 includes a device identification circuit 207A (shown in FIG. 2A as device ID circuit 207A) configured to generate and/or manage a device identifier associated with the exchange node 130. The device identifier may include any type and form of identification used to distinguish the exchange node 130 from other computing devices. In some arrangements, a device identifier may be associated with one or more other device identifiers. In some arrangements, to preserve privacy, the device identifier may be cryptographically generated, encrypted, or otherwise obfuscated by any circuit of the exchange node 130. In some arrangements, the exchange node 130 may include the device identifier in any communication (Any of the messages in FIG. 1, e.g., a monitoring agent setup command, a coin creation command, a lock/unlock command, a coin creation command, etc.) that the exchange node 130 sends to a computing device.

The exchange node 130 includes a digital currency coexistence (DCC) circuit 208A that may be configured to receive, via the communication network 120, a request from a node (e.g., node 103*a* in FIG. 1) of a "first" DLT network (e.g., DLT network 102 in FIG. 1) to join an exchange network that is managed (hosted) by the exchange node 130. The exchange network may be an organization of DLT networks, an association of DLT networks, or a group/collection of DLT networks; where each DLT network is associated with one another by virtue of their membership to the exchange network. In response to receiving the request, the DCC circuit 208A may send a message (e.g., "monitoring agent setup command" in FIG. 1) to the DLT network 102, where the message causes the DLT network 102 (e.g., one or more nodes of the DLT network 102) to authorize the exchange node to detect (e.g., monitor) transaction requests that are associated (e.g., sent by, sent to, or received by) with the DLT network 102. A transaction request may be a request that is sent between nodes of a DLT network (e.g., DLT network 102 in FIG. 1), or a request that is sent between a node on a first DLT network (e.g., DLT network 102 in FIG. 1) and a node of second DLT network (e.g., DLT network 104 in FIG. 1).

In some arrangements, the message includes program code (e.g., a script, an executable) that, when executed by a node of a DLT network, causes the node to install one or more monitoring agents (e.g., monitoring agent 150 in FIG. 1) on any or all of the nodes included in the DLT network to allow the exchange node 130 to detect an occurrence of a transaction request. For example, node 103*a* may execute the program code to install the monitoring agent 150 within its memory (e.g., memory 204B) allowing the monitoring agent to detect (e.g., monitor) the communication to and/or from its digital currency transaction circuit (e.g., DCT circuit 210B in FIG. 2B) and/or it network interface (e.g., network interface 206B in FIG. 2B). As another example, node 103*a* may execute the program code to install one or more monitoring agents for monitoring systems (e.g., subsystems) of an operating system executing on the node 103*a*. That is, node 103*a* may install a "file system monitoring agent" configured to monitor the file system of the operating system for instructions that are sent to and/or by the file system that are indicative of a transaction request. The node 103*a* may install a "network system monitoring agent" configured to monitor the network system of the operating system for instructions that are sent to and/or by the network system that are indicative of a transaction request. The node 103*a* may install a "process system monitoring agent" configured to monitor the process system of the operating system for instructions that are sent to and/or by the process system that are indicative of a transaction request. The node 103*a* may install a "memory management system monitoring agent" configured to monitor the memory system of the operating system for instructions that are sent to and/or by the memory system that are indicative of a transaction request.

In some arrangements, the message may include program code that, when executed by a node of a DLT network, causes the node to install one or more "hooks" (not shown in FIG. 1) that augment the behavior of an operating system and/or an application executing on the node to intercept the function calls, messages, and/or events passed between software components (e.g., a digital wallet) executing on the node and/or a transaction ledger (e.g., transaction ledger 218 in FIG. 2B) stored on the node and to redirect the intercepted function calls, messages, and/or events to the exchange node 130. The exchange node 130 may then determine if the node has sent and/or received a transaction request based on analyzing and/or processing the redirected communication (e.g., the function calls, the messages, and/or the events). The operating system and/or application executing on the node may grant permission for the exchange node 130 to insert the hook into the operating system and/or application when it sends the join request (shown in FIG. 1 as "join requests") to the exchange node 130.

In some arrangements, the message (e.g., monitoring agent setup command in FIG. 1) may include a smart contract, that when executed by the node, causes the node (or the exchange node) of the DLT network to monitor/ detect the transactions that are made by the node. That is, a smart contract is a self-executing contract where the terms and conditions are defined and enforced using software. The node may store the smart contract on the blockchain. When a transaction request is sent or received by the node on the same DLT network, the smart contract may execute to notify the exchange node of the transaction request.

The message may cause the node (e.g., node 103a) to send the message (or copies thereof) to other nodes in the DLT network 102, thereby causing those nodes to also install their own monitoring agent 150 to allow the exchange node to detect (e.g., monitor) their respective digital currency transaction circuits. In some arrangements, the message causes the node (e.g., node 103a) to send the message (or copies thereof) to only the "master nodes" (as discussed herein) that are operating on the DLT network 102, which in turn, causes the master node to install the monitoring agent 150 within the memory (e.g., memory 204B in FIG. 2B) of the master node. The monitoring agent 150 that is installed on the master node allows the exchange node to detect (e.g., monitor) the communication to and/or from the master node.

The DCC circuit 208A may repeat the joining process for any number of DLT networks. For example, the DCC circuit 208A may add a "second" DLT network (e.g., DLT network 104) and a "third" DLT network (e.g., DLT network 106), where the one or more nodes of the second and third DLT networks install their own monitoring agents 150 to allow the exchange node 130 to detect (e.g., monitor) communication to and/or from the respective nodes.

The DCC circuit 208A may be configured to create (e.g., mirror) multiple types of digital currency across the multiple DLT networks that have joined the exchange network. The DCC circuit 208A creates each digital currency based on the same collateral such that each digital currency simultaneously represent (e.g., on their respective DLT networks) a value associated with the same collateral. For example, the exchange network may include DLT network 102 and DLT network 104. As such, the DCC circuit 208A would create, based on the same unit of fiat currency (e.g., fiat currency 142 in FIG. 1), a first digital currency of a first type (e.g., a Bitcoin) on DLT network 102 and a second digital currency of a second type (e.g., an Ether) on DLT network 104. Thus, first digital currency and the second digital currency would simultaneously represent the value associated with the unit of fiat currency for at least a period of time. In some arrangements, the first digital currency and the second digital currency would equally represent the value associated with the unit of fiat currency. In some arrangements, the first type, the second type, and the third type may be different types of digital currency. In some arrangements, any of the first type, the second type, and the third type may be the same type of digital currency.

The DCC circuit 208A may be configured to determine the type of digital currency to create for a DLT network by determining a network type that is associated with a DLT network. For example, the DCC circuit 208A may send a request to node 103a of DLT network 102 to request for node 103a to return the network type (e.g., a Bitcoin network, an Ethereum network, a Ripple network, etc.) that is associated with DLT network 102. In response, the node 103a may send the network type to the DCC circuit 208A. As another example, the DCC circuit 208A may determine the network type that is associated with DLT network 102 by traversing and/or analyzing a node (e.g., node 103a) of the DLT network to acquire (e.g., gather, collect, etc.) characteristics of the node that indicate the type of network that the node is operating on and/or operating within.

The DCC circuit 208A may be configured to assign and/or attach a common ("global") serial number to each of the digital currency (also referred to herein as, "digital coins" or "coins") that it creates based on the same collateral to indicate that the digital currency were created from the same collateral. For example, the DCC circuit 208A may create a digital currency 110 (e.g., an Ether) on DLT network 102 based on a unit of fiat currency 142 and attach a serial number to the digital currency 110. The DCC circuit 208A may then create a digital currency 112 (e.g., a Bitcoin) on DLT network 104 based on the unit of fiat currency 142 and attach the same serial number to the digital currency 112. In some arrangements, the DCC circuit 208A may generate a serial number that is "unique" by randomly generating the serial number. In some arrangements, a serial number may be unique, in that it is associated with collateral, where no other serial numbers associated with any of the DLT networks 102, 104, 106 are associated with the same collateral. In some arrangements, a serial number may be unique in that it is associated with only one DLT network. In some arrangements, the DCC circuit 208A may retrieve the serial number from a database or storage (e.g., serial number storage 160 in FIG. 1).

The DCC circuit 208A may be configured to store the serial numbers that it assigns and/or attaches to each of the digital currency in a storage (e.g., serial number storage 160 in FIG. 1). The DCC circuit 208 may maintain, in the storage, a plurality of associations between a plurality of serial numbers and plurality of digital currencies. Each association is a link between a digital currency and the serial number that the DCC circuit 208A assigned and/or attached to the digital currency.

The DCC circuit 208A may be configured to detect a transaction request to transfer a digital currency from a first DLT network to a second DLT network. For example, the node 105a of DLT network 104 may send a transaction request to node 103a of DLT network 102 requesting to transfer a digital currency between the DLT networks. If a monitoring agent 150 is installed on node 103a, then the DCC circuit 208A may detect the transaction request via the monitoring agent 150 installed on node 103a. If a monitoring agent 150 is installed on node 105a, then the DCC circuit 208A may detect the transaction request via the monitoring agent 150 installed on node 105a. If monitoring agents 150 are each installed on node 103a and node 105a, then the DCC circuit 208A may detect the transaction request via either one or both of the monitoring agents 150.

In some arrangements, a monitoring agent 150 that is installed on a node of a DLT network causes the node to intercept the transaction request and redirect the transaction request to the DCC circuit 208A before the node 103a has an opportunity to process the transaction request. In response to receiving the request, the DCC circuit 208A may process (e.g., lock the digital currency 110 onto the DLT network 102) the transaction request and then send a message (not shown in FIG. 1) to allow the node 103a to process the transaction request that its respective monitoring agent 150 intercepted. The message may include the transaction request (or details thereof) that were originally sent by the node 105a to the node 103a.

In some arrangements, the monitoring agent 150 redirects a copy of the transaction request to the DCC circuit 208A. In this instance, the node 103a still receives the transaction request that was sent by another node 105a, thereby allowing the node 103a to process the transaction request without having to wait for the DCC circuit 208A to send a message, as discussed above. As such, the node 103a and the DCC circuit 208A may concurrently process the transaction requests that they each receive.

In some arrangements, the DCC circuit 208A may be configured to detect a transaction request to transfer a digital currency from a first DLT network to a second DLT network based on receiving a message from the first DLT network and/or the second DLT network. For example, a DLT network that joins the exchange network may enter into an agreement with the exchange node 130 where the terms (e.g., a set of rules) of the agreement require for the nodes of the DLT network to send their respective transaction requests, or the transaction requests that the nodes detect (via any of the techniques discussed here), to the DCC circuit 208A.

The DCC circuit 208A may be configured to lock, responsive to detecting a transaction request, a digital currency that is identified in the transaction request onto a DLT network to prevent a transfer of the digital currency from the DLT network to another DLT network responsive to receiving a subsequent transaction request. For example, the DCC circuit 208A may detect that node 103a of DLT network 102 sent a transaction request to node 105a of DLT network 104 to transfer the digital currency 112 (e.g., a Bitcoin) from DLT network 104 to DLT network 102. In response to detecting the transaction request, the DCC circuit 208A may lock the digital currency 112 onto the DLT network 104. While the digital currency 112 is in a "locked" state, the nodes 105 of the DLT network 104 are prevented from transferring the digital currency 112 as the result of a subsequent transaction request. That is, a subsequent transaction request that is a transaction request that is different from the transaction request that initially prompted the DCC circuit 208A to lock the digital currency onto the DLT network.

In some arrangements, the DCC circuit 208A locks the digital currency 112 onto the DLT network 104 by encrypting the digital currency using a cryptographic algorithm and based on a serial number that is associated (e.g., assigned, attached) with the digital currency to generate a locked digital currency 116. The DCC circuit 208A would then remove the digital currency 112 from the DLT network 104 such that only the locked digital currency 116 remains on the DLT network 104. Thus, a node would be unable to access and/or transfer the locked digital currency 116 from the DLT network 104 without being able to identify the locked digital currency 116 on the DLT network 104 and decrypt it. In some arrangements, the DCC circuit 208A prevents the nodes of a DLT network from recording, in their respective electronic transaction ledger (e.g., transaction ledger 218B in FIG. 2B), the existence of the locked digital currency 116.

The DCC circuit 208A may be configured to send, responsive to locking a digital currency onto the first DLT network, a confirmation request to the second DLT network, to cause the second DLT network to generate a confirmation indicating whether the transfer of the digital currency from the first DLT network to the second DLT network has completed. The DCC circuit 208A may be configured to receive the confirmation from the DLT network. In some arrangements, the confirmation request includes a serial number (e.g., a common serial number, a global serial number) that is associated with the first digital currency. In some arrangements, the confirmation request causes the second DLT network to generate the confirmation by searching the second DLT network for a digital currency that is associated (e.g., assigned, attached) with the serial number. For example, the DCC circuit 208A may send a confirmation request to the DLT network 104 where the confirmation request includes a "first" serial number (e.g., 1007) that is attached to the digital currency 110. In response to receiving the confirmation request, the DLT network 104 may search the electronic transaction ledger (e.g., transaction ledger 218B in FIG. 2B) of one or more nodes of the DLT network 104 for a digital currency associated with the "first" serial number (e.g., 1007), and determine that the digital currency 112 is associated with a "second" serial (e.g., 1007) that matches the "first" serial number.

The DCC circuit 208A may be configured to determine a presence or an absence of the second digital currency on the second DLT network. For example, the DCC circuit 208A may search the electronic transaction ledger (e.g., transaction ledger 218B in FIG. 2B) of one or more nodes of the DLT network 104 for a digital currency associated with the "first" serial number and determine that the digital currency 112 is associated with a "second" serial number (e.g., 1007) that matches the "first" serial number. In some arrangements, the DCC circuit 208A searches the electronic transaction ledger of the one or more nodes 105 of the DLT network 104 via the one or more monitoring agents 150 that were installed on the one or more nodes 105 of the DLT network 104.

In response to determining a presence of the second digital currency (e.g., digital currency 112 in FIG. 1) on the second DLT network (e.g., DLT network 104 in FIG. 1), the DCC circuit 208A may destroy the first digital currency (e.g., digital currency 110 in FIG. 1) on the first DLT network (e.g., DLT network 102 in FIG. 1). In some arrangements, the DCC circuit 208A destroys the first digital currency on the first DLT network by deleting (e.g., removing) an entry on an electronic transaction ledger (e.g., transaction ledger 218B in FIG. 2B) of a node. In some arrangements, the DCC circuit 208A causes the node to broadcast the electronic transaction ledger (now updated) to other nodes in the DLT network 102. In some arrangements, the DCC circuit 208A may keep (maintain, preserve, etc.) the first digital currency (e.g., digital currency 110 in FIG. 1) locked to the first DLT network (e.g., DLT network 102 in FIG. 1) instead of destroying the first digital currency, thereby allowing the second DLT network (e.g., DLT network 104 in FIG. 1) to transfer the second digital currency (e.g., digital currency 112 in FIG. 1) back to the first DLT network if requested via a second transaction request.

In response to determining an absence of the second digital currency (e.g., digital currency 112 in FIG. 1) on the second DLT network (e.g., DLT network 104 in FIG. 1), the DCC circuit 208 A may unlock the first digital currency (e.g., digital currency 110) from the first DLT network (e.g., DLT network 102) to allow a transfer of the first digital currency from the first DLT network to another DLT network responsive to receiving a subsequent transaction request. In some arrangements, the DCC circuit 208A locked the digital currency 110 onto the DLT network 102 by encrypting the digital currency 110 using a cryptographic algorithm and based on the serial number that is associated (e.g., assigned, attached) with the digital currency 110 to generate a locked digital currency (not shown in FIG. 1). In this instance, to unlock the locked digital currency from the DLT network 102, the DCC circuit 208A would decrypt the locked digital currency using the cryptographic algorithm and based on the serial number to generate the digital currency 110, which is the unlocked version of the locked digital currency. The DCC circuit 208A would then remove the locked digital currency from the DLT network 102 such that only the digital currency 110 remains on the DLT network 102.

The DCC circuit 208A may be configured to send, responsive to determining the absence, a message to the first DLT network (e.g., DLT network 102) indicating a denial of the transaction request.

The DCC circuit 208A may be configured to receive a request from an additional DLT network to join the exchange network. In response to receiving the request, the DCC circuit 208A may send a message to the first DLT network, the second message causes the third DLT network to authorize the one or more processors to monitor transaction requests associated with the third DLT network. In response to receiving the request, the DCC circuit 208 may create, based on the unit of fiat currency, a third digital currency (e.g., digital currency 114) of a third type on the third DLT network (e.g., DLT network 106). In some arrangements, the first digital currency, the second digital currency, and the third digital currency simultaneously represent a value associated with the unit of fiat currency for at least a period of time.

The exchanges node 130 includes a bus (not shown), such as an address/data bus or other communication mechanism for communicating information, which interconnects circuits and/or subsystems of the exchange node 130. In some arrangements, the exchanges node 130 may include one or more of any such circuits and/or subsystems.

In some arrangements, some or all of the circuits of the exchange node 130 may be implemented with the processing circuit 202A. For example, the DCC circuit 208A may be implemented as a software application stored within the memory 204A and executed by the processor 203A. Accordingly, such arrangement can be implemented with minimal or no additional hardware costs. In some arrangements, any of these above-recited circuits rely on dedicated hardware specifically configured for performing operations of the circuit.

Figure 2B:
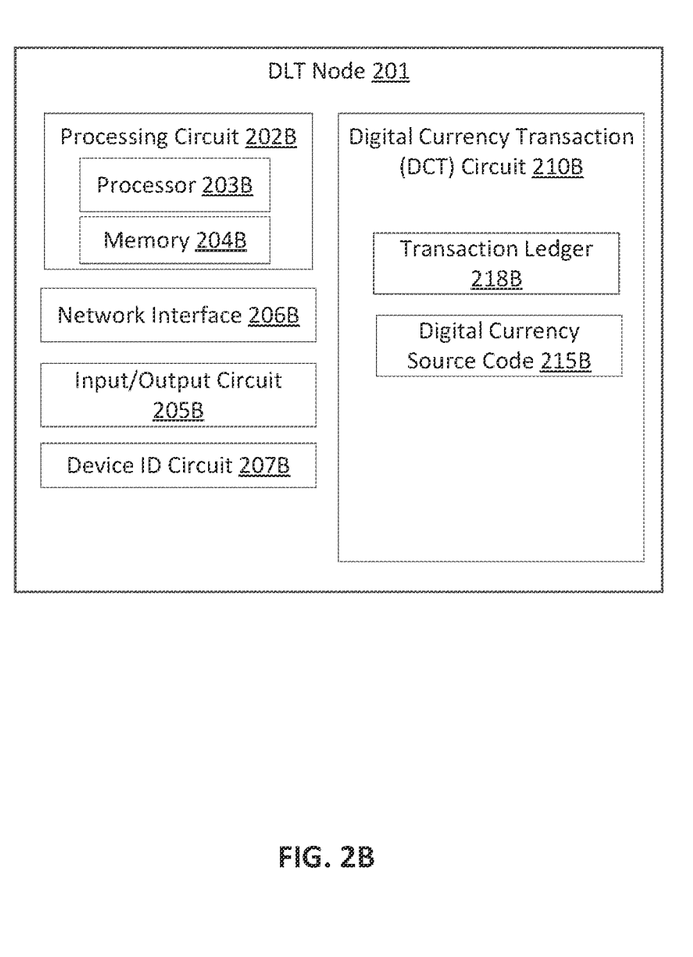
FIG. 2B is a block diagram depicting an example DLT node of the environment in FIG. 1, according to some arrangements.

FIG. 2B is a block diagram depicting an example node of the environment in FIG. 1, according to some arrangements. That is, any of the nodes (e.g., nodes 103, 105, 107) in FIG. 1 may be a DLT node 201 in FIG. 2B. While various circuits, interfaces, and logic with particular functionality are shown, it should be understood that DLT node 201 includes any number of circuits, interfaces, and logic for facilitating the functions described herein. For example, the activities of multiple circuits may be combined as a single circuit and implemented on a single processing circuit (e.g., processing circuit 202B), as additional circuits with additional functionality are included.

The DLT node 201 includes a processing circuit 202B composed of one or more processors 203A and a memory 204B. The processing circuit 202B includes identical or nearly identical functionality as processing circuit 202A in FIG. 2A, but with respect to circuits and/or subsystems of the DLT node 201 instead of circuits and/or subsystems of the exchange node 130.

The memory 204B (e.g., Random Access Memory (RAM), Read-Only Memory (ROM), Non-volatile RAM (NVRAM), Flash Memory, hard disk storage, optical media, etc.) of processing circuit 202B stores data and/or computer instructions/code for facilitating at least some of the various processes described herein. The memory 204B includes identical or nearly identical functionality as memory 204A in FIG. 2A, but with respect to circuits and/or subsystems of the DLT node 201 instead of circuits and/or subsystems of the exchange node 130.

The DLT node 201 includes a network interface 206B configured to establish a communication session with a computing device for sending and receiving data over the communication network 120 to the computing device. Accordingly, the network interface 206B includes identical or nearly identical functionality as network interface 206A in FIG. 2A, but with respect to circuits and/or subsystems of DLT node 201 instead of circuits and/or subsystems of the exchange node 130.

The DLT node 201 includes an input/output circuit 205B configured to receive user input from and provide information to a user. In this regard, the input/output circuit 205B is structured to exchange data, communications, instructions, etc. with an input/output component of the DLT node 201. The input/output circuit 205B includes identical or nearly identical functionality as input/output circuit 205A in FIG. 2A, but with respect to circuits and/or subsystems of the DLT node 201 instead of circuits and/or subsystems of the exchange node 130.

The DLT node 201 includes a device identification circuit 207B (shown in FIG. 2B as device ID circuit 207B) configured to generate and/or manage a device identifier associated with the DLT node 201. The device ID circuit 207B includes identical or nearly identical functionality as device ID circuit 207A in FIG. 2A, but with respect to circuits and/or subsystems of the DLT node 201 instead of circuits and/or subsystems of the exchange node 130.

The DLT node 201 includes a digital currency transaction (DCT) circuit 210B composed of digital currency source code 215B and an electronic transaction ledger (shown in FIG. 1 as, "transaction ledger 218B"). The digital currency source code 215B may be stored in memory 204B, which may be accessed by and/or run on processor 203B. The transaction ledger 218B (shown in FIG. 1 as, "transaction ledger 218B") may be stored on the same and/or different processor readable memory, which may be accessible by processor 203A when running the digital currency source code 215B. In some arrangements, the transaction leger 215B on a first node (e.g., node 103a in FIG. 1) of a DLT network corresponds with the transaction ledger of one or more nodes within the DLT network, to the extent that the nodes have synchronized/updated their electronic transaction ledgers (e.g., received the latest transactions via a download or during a reconciliation process). Accordingly, the electronic transaction ledger 115 may be a public ledger.

A DLT node 201 of a "first" DLT network (e.g., DLT network 102 in FIG. 1) may be configured to send, via the communication network 120, a request to an exchange node (e.g., exchange node 130 in FIG. 1) to join an exchange network that is managed (hosted) by the exchange node 130.

The DLT node 201 may be configured to receive a message from the exchange node 130 that causes the DLT node 201 to authorize the exchange node 130 to detect (e.g., monitor) transaction requests that are associated (e.g., sent by, sent to, or received by) with the DLT network 102. In some arrangements, the message includes program code (e.g., a script, an executable) that, when executed by a node of a DLT network, causes the node to install one or more monitoring agents (e.g., monitoring agent 150 in FIG. 1) on any or all of the nodes included in the DLT network to allow the exchange node 130 to detect an occurrence of a transaction request.

The message may cause the node (e.g., node 103a) to send the message (or copies thereof) to other nodes in the DLT network 102, thereby causing those nodes to also install their own monitoring agent 150 to allow the exchange node to detect (e.g., monitor) their respective digital currency transaction circuits. In some arrangements, the message causes the node (e.g., node 103a) to send the message (or copies thereof) to only the "master nodes" (as discussed herein) that are operating on the DLT network 102, which in turn, causes the master node to install the monitoring agent 150 within the memory (e.g., memory 204B in FIG. 2B) of the master node. The monitoring agent 150 that is installed on the master node allows the exchange node to detect (e.g., monitor) the communication to and/or from the master node.

The DLT node 201 may be configured to receive a message (e.g., coin creation command in FIG. 1) causing the DLT node 201 to create a digital currency based on a unit of fiat currency (e.g., fiat currency 142 in FIG. 1) that is identified in the message.

The DLT node 201 may be configured to receive a request from the exchange node 130 to return the network type (e.g., a Bitcoin network, an Ethereum network, a Ripple network, etc.) that is associated with DLT network of the DLT node 201. In response, the DLT node 201 sends the network type to the exchange node 130.

As discussed herein, the DLT node 201 may be configured to install one or more monitoring agents (e.g., monitoring agent 150 in FIG. 1) within its memory to allow the monitoring agent to detect an occurrence of a transaction request associated (e.g., sent to, sent by, received by) with the DLT node 201.

In some arrangements, the DLT node 201 may be configured to detect a transaction request by determining that a copy of an electronic transaction ledger that was broadcasted by a neighboring node (e.g., node 103b in FIG. 1) includes one or more transaction entries that are different than the transaction entries of an electronic transaction ledger (e.g., transaction ledger 218B in FIG. 2B) previously stored on the node. For example, node 103a of DLT network 102 may receive a transaction request from node 105a of DLT network 104 to transfer a digital currency 110 (e.g., an Ether) from DLT network 102 to DLT network 104. In response to receiving the transaction request, the DLT network 102 may post (e.g., write, record) the transaction request as an entry on its electronic transaction ledger (e.g., transaction ledger 218B on node 103a) and broadcast a copy of its electronic transaction ledger (now updated) to node 103c in DLT network for validation. In response to receiving the copy of the electronic transaction ledger, the node 103c may compare the entries of the received electronic transaction ledger with the transaction entries of its own electronic transaction ledger (e.g., transaction ledger 218B on node 103c). The node 103c determines that a transaction request occurred if it determines, as a result of the comparison, that the electronic transaction ledgers are different. The node then sends a message to the exchange node 130 to indicate that the node detected a transaction request, where the message includes the details (e.g., transacting parties, transacting amount, etc.) associated with the transaction request.

The DLT node 201 may be configured to receive a message (e.g., lock/unlock command in FIG. 1) from the exchange node 130 to lock a digital currency onto a DLT network to prevent a transfer of the digital currency from the DLT network to another DLT network responsive to a subsequent transaction request. The DLT node 201 may be configured to receive a message (e.g., lock/unlock command in FIG. 1) from the exchange node 130 to unlock the digital currency from the DLT network to allow a transfer of the digital currency from the DLT network to another DLT network responsive to the subsequent transaction request.

The DLT node 201 may be configured to receive a confirmation request from the exchange node 130 to return a confirmation indicating whether the transfer of the digital currency from the first DLT network to the second DLT network has completed. In response to receiving the request, the DLT node 201 determines if the transfer has completed and sends a confirmation to the exchange node 130 indicating this determination. In some arrangements, the confirmation request causes the DLT node 201 to generate the confirmation by searching the DLT network of the DLT node 201 for a digital currency that is associated (e.g., assigned, attached) with a "common" or "global" serial number. In some arrangements, the DLT node 201 may search the electronic transaction ledger (e.g., transaction ledger 218B in FIG. 2B) of one or more nodes of the DLT network for a digital currency associated with the serial number.

The DLT node 201 includes a bus (not shown), such as an address/data bus or other communication mechanism for communicating information, which interconnects circuits and/or subsystems (e.g., digital currency transaction circuit 210B) of the DLT node 201. In some arrangements, the DLT node 201 may include one or more of any such circuits and/or subsystems.

In some arrangements, some or all of the circuits of the DLT node 201 may be implemented with the processing circuit 202B. For example, any of the DLT node 201 may be implemented as a software application stored within the memory 204B and executed by the processor 203B. Accordingly, such arrangement can be implemented with minimal or no additional hardware costs. In some arrangements, any of these above-recited circuits rely on dedicated hardware specifically configured for performing operations of the circuit.

Figure 3:
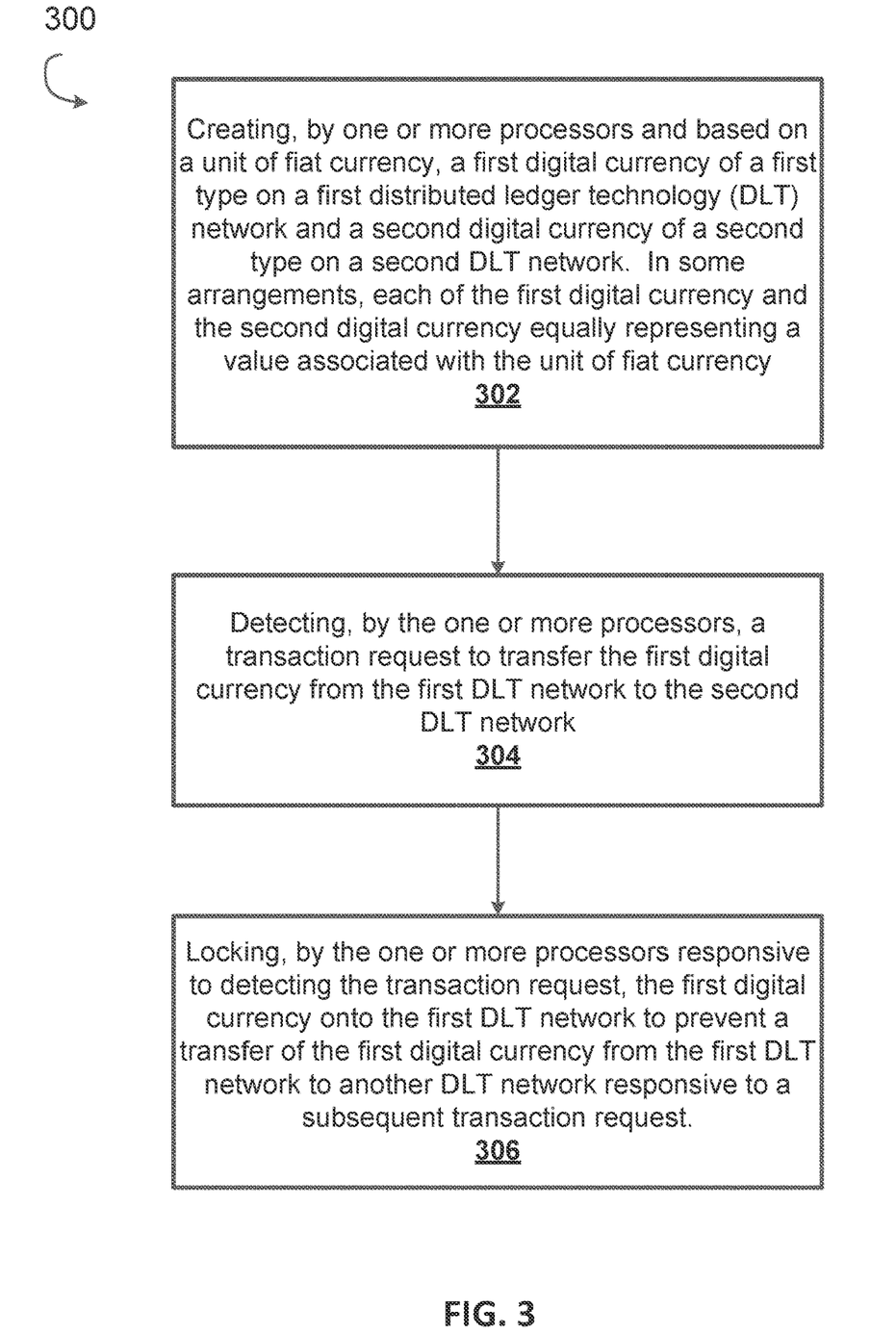
FIG. 3 is a flow diagram depicting a method for preventing the double-spending of digital currency that transfers between multiple DLT networks from the perspective of an exchange node, according to some arrangements.

FIG. 3 is a flow diagram depicting a method for preventing the double-spending of digital currency that transfers between multiple DLT networks from the perspective of an exchange node, according to some arrangements. Additional, fewer, or different operations may be performed in the method depending on the particular arrangement. In some arrangements, some or all operations of method 300 may be performed by one or more processors executing on one or more computing devices, systems, or servers. In some arrangements, method 300 may be performed by one or more exchange nodes, such as exchange node 130 in FIG. 1. Each operation may be re-ordered, added, removed, or repeated.

As shown in FIG. 3, the method 300 includes the operation 302 of creating, by one or more processors and based on a unit of fiat currency, a first digital currency of a first type on a first DLT network and a second digital currency of a second type on a second DLT network. In some arrangements, each of the first digital currency and the second digital currency equally represent a value associated with the unit of fiat currency. The method also includes the operation 304 of detecting, by the one or more processors, a transaction request to transfer the first digital currency from the first DLT network to the second DLT network. The method also includes the operation 306 of locking, by the one or more processors responsive to detecting the transaction request, the first digital currency onto the first DLT network to prevent a transfer of the first digital currency from the first DLT network to another DLT network responsive to a subsequent transaction request.

Figure 4:
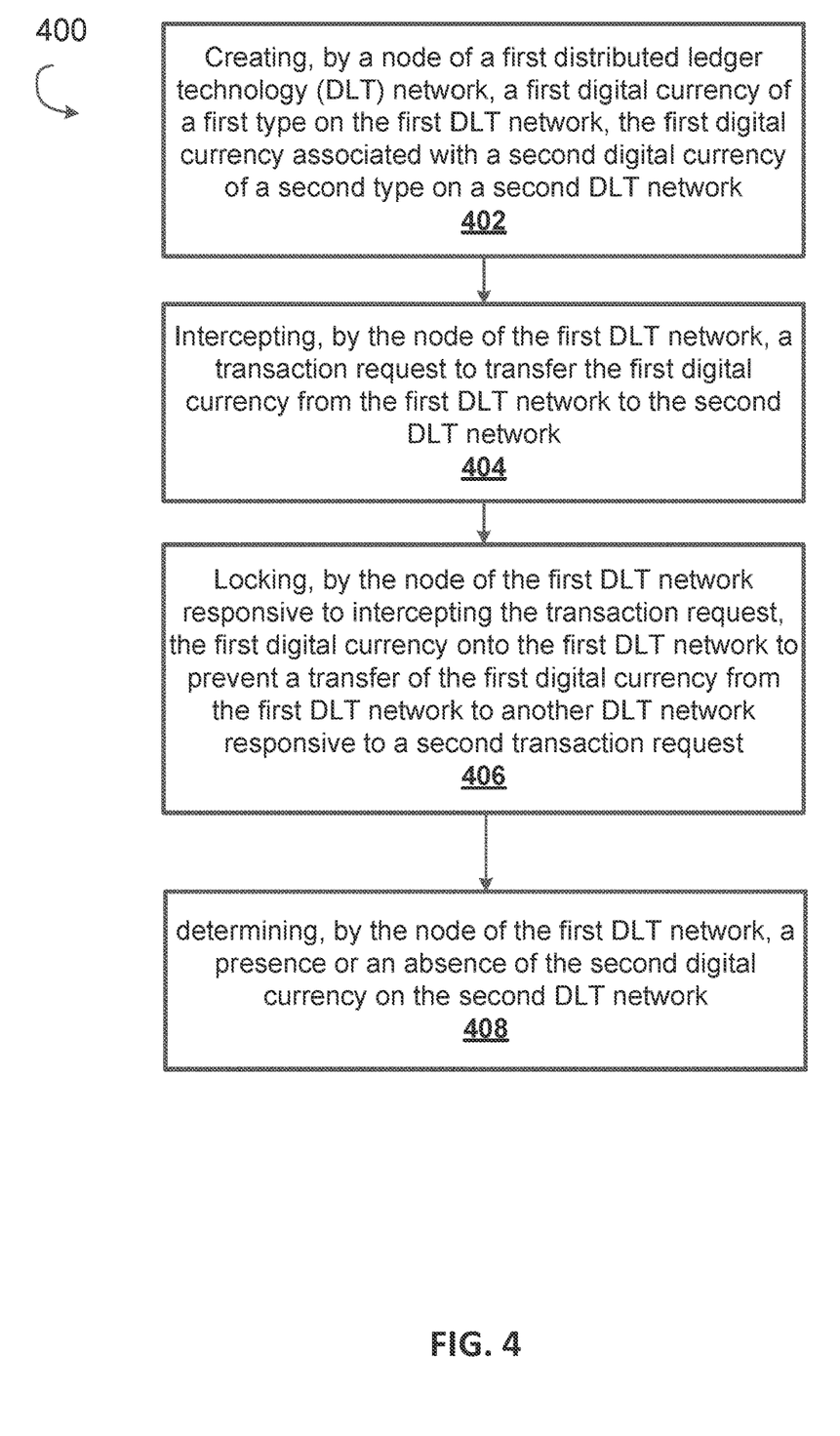
FIG. 4 is a flow diagram depicting a method for preventing the double-spending of digital currency that transfers between multiple DLT networks from the perspective of a DLT node, according to some arrangements.

FIG. 4 is a flow diagram depicting a method for preventing the double-spending of digital currency that transfers between multiple DLT networks from the perspective of a DLT node, according to some arrangements. Additional, fewer, or different operations may be performed in the method depending on the particular arrangement. In some arrangements, some or all operations of method 400 may be performed by one or more processors executing on one or more computing devices, systems, or servers. In some arrangements, some or all operations of method 400 may be performed by one or more nodes, such as any of nodes 103, 105, 107 in FIG. 1. Each operation may be re-ordered, added, removed, or repeated.

As shown in FIG. 4, the method 400 includes the operation 402 of creating, by a node of a first DLT network, a first digital currency of a first type on the first DLT network, the first digital currency associated with a second digital currency of a second type on a second DLT network. In some arrangements, the node of the first DLT network sends a message to the exchange node to notify the exchange node that the digital currency have been created on the first DLT network. The method also includes the operation 404 of intercepting, by the node of the first DLT network, a transaction request to transfer the first digital currency from the first DLT network to the second DLT network. The method also includes the operation 406 of locking, by the node of the first DLT network responsive to intercepting the transaction request, the first digital currency onto the first DLT network to prevent a transfer of the first digital currency from the first DLT network to another DLT network responsive to a second transaction request. The method also includes the operation 408 of determining, by the node of the first DLT network, a presence or an absence of the second digital currency on the second DLT network.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Ethereum, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

It is also understood that any reference to an element herein using a designation such as "first," "second," and so forth does not generally limit the quantity or order of those elements. Rather, these designations can be used herein as, a convenient means of distinguishing between two or more elements or instances of an element. Thus, a reference to first and second elements does not mean that only two elements can be employed, or that the first element must precede the second element in some manner.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method, comprising:
creating, by a node of a first distributed ledger technology (DLT) network, a first digital currency of a first type on the first DLT network stored in a digital wallet, the first digital currency associated with a second digital currency of a second type on a second DLT network;
configuring, by the digital wallet of the first DLT network, a monitoring agent on the node, the monitoring agent configured to intercept at least one of a function call, a message, or an event on the digital wallet; and
locking, by the node of the first DLT network responsive to intercepting the at least one of the function call, the message, or the event, the first digital currency onto the first DLT network to prevent a transfer of the first digital currency from the digital wallet on the first DLT network to another DLT network responsive to a subsequent transaction request.

2. The method of claim 1, wherein creating the first digital currency and the second digital currency comprises:
maintaining, by the node and in a database, an association between a serial number and each of the first digital currency and the second digital currency; and
attaching, by the node, the serial number to each of the first digital currency and the second digital currency.

3. The method of claim 2, further comprising:
sending, by the node responsive to locking the first digital currency on the first DLT network, a confirmation request to the second DLT network, the confirmation request causing the second DLT network to generate a confirmation indicating whether the transfer of the first digital currency from the first DLT network to the second DLT network has completed; and
receiving, by the node, the confirmation from the second DLT network.

4. The method of claim 3, wherein the confirmation request comprises the serial number associated with the first digital currency and the second digital currency, and wherein the confirmation request causes the second DLT network to generate the confirmation by searching the second DLT network for the second digital currency associated with the serial number.

5. The method of claim 2, further comprising:
determining, by the node, a presence or an absence of the second digital currency on the second DLT network; and
unlocking, by the node and responsive to determining the absence of the second digital currency on the second DLT network, the first digital currency from the first DLT network.

6. The method of claim 1, further comprising:
sending, by the node, a request to join an exchange network comprising a third DLT network; and
receiving, by the node, a second message causing the first DLT network to authorize the exchange to detect transaction requests associated with the first DLT network.

7. The method of claim 6, wherein the first DLT network detects the transaction requests associated with the first DLT network via the monitoring agent that is installed on the first DLT network.

8. The method of claim 6, further comprising:
receiving, by the node and from the third DLT network, a request to join the exchange network associated with the node;
sending, by the node, a third message to the third DLT network, the second third causing the third DLT network to authorize the node to detect the transaction requests associated with the third DLT network; and
creating, by the node and based on a unit of fiat currency, a third digital currency of a third type on the third DLT network, wherein the first digital currency, the second digital currency, and the third digital currency simultaneously represent a value associated with the unit of fiat currency for at least a period of time.

9. The method of claim 8, wherein the first digital currency of the first type, the second digital currency of the second type, and the third digital currency of the third type are different types of digital currency.

10. A node of a first distributed ledger technology (DLT) network comprising:
a processing circuit comprising memory and one or more processors to:

create a first digital currency of a first type on the first DLT network stored in a digital wallet, the first digital currency associated with a second digital currency of a second type on a second DLT network;

configure, using the digital wallet, a monitoring agent on the node, the monitoring agent configured to intercept at least one of a function call, a message, or an event on the digital wallet; and lock, responsive to intercepting the at least one of the function call, the message, or the event, the first digital currency onto the first DLT network to prevent a transfer of the first digital currency from the digital wallet on the first DLT network to another DLT network responsive to a subsequent transaction request.

11. The node of claim 10, wherein the one or more processors create the first digital currency and the second digital currency to:

maintain, in a database, an association between a serial number and each of the first digital currency and the second digital currency; and attach the serial number to each of the first digital currency and the second digital currency.

12. The node of claim 11, the one or more processors further to:

send, responsive to locking the first digital currency on the first DLT network, a confirmation request to the second DLT network, the confirmation request causing the second DLT network to generate a confirmation indicating whether the transfer of the first digital currency from the first DLT network to the second DLT network has completed; and receive the confirmation from the second DLT network.

13. The node of claim 12, wherein the confirmation request comprises the serial number associated with the first digital currency and the second digital currency, and wherein the confirmation request causes the second DLT network to generate the confirmation by searching the second DLT network for the second digital currency associated with the serial number.

14. The node of claim 11, the one or more processors further to:

determine a presence or an absence of the second digital currency on the second DLT network; and unlock, responsive to determining the absence of the second digital currency on the second DLT network, the first digital currency from the first DLT network.

15. The node of claim 10, the one or more processors further to:

sending, by the node, a request to join an exchange network comprising a third DLT network; and receiving, by the node, a second message causing the first DLT network to authorize the exchange to detect transaction requests associated with the first DLT network.

16. The node of claim 15, wherein the first DLT network detects the transaction requests associated with the first DLT network via the monitoring agent that is installed on the first DLT network.

17. The node of claim 15, the one or more processors further to:

receive, from the third DLT network, a request to join the exchange network associated with the node;

send a third message to the third DLT network, the second third causing the third DLT network to authorize the node to detect the transaction requests associated with the third DLT network; and create, based on a unit of fiat currency, a third digital currency of a third type on the third DLT network, wherein the first digital currency, the second digital currency, and the third digital currency simultaneously represent a value associated with the unit of fiat currency for at least a period of time.

18. The node of claim 17, wherein the first digital currency of the first type, the second digital currency of the second type, and the third digital currency of the third type are different types of digital currency.

19. One or more non-transitory computer-readable storage media having instructions stored thereon that, when executed by at least one processing circuit, cause the at least one processing circuit to:

create a first digital currency of a first type on the first DLT network stored in a digital wallet, the first digital currency associated with a second digital currency of a second type on a second DLT network;

configure, using the digital wallet, a monitoring agent on the at least one processing circuit, the monitoring agent configured to intercept at least one of a function call, a message, or an event on the digital wallet; and lock, responsive to intercepting the at least one of the function call, the message, or the event, the first digital currency onto the first DLT network to prevent a transfer of the first digital currency from the digital wallet on the first DLT network to another DLT network responsive to a subsequent transaction request.

20. One or more non-transitory computer-readable storage media of claim 19 having additional instructions stored thereon that, when executed by the at least one processing circuit, cause the at least one processing circuit to:

maintain, in a database, an association between a serial number and each of the first digital currency and the second digital currency;

attach the serial number to each of the first digital currency and the second digital currency;

send, responsive to locking the first digital currency on the first DLT network, a confirmation request to the second DLT network, the confirmation request causing the second DLT network to generate a confirmation indicating whether the transfer of the first digital currency from the first DLT network to the second DLT network has completed; and receive the confirmation from the second DLT network, wherein the confirmation request comprises the serial number associated with the first digital currency and the second digital currency, and wherein the confirmation request causes the second DLT network to generate the confirmation by searching the second DLT network for the second digital currency associated with the serial number.

* * * * *